Jan. 24, 1961 L. P. CROSET 2,968,936
SPINDLE COUPLING DEVICES FOR ROTARY MEMBERS
Filed Aug. 20, 1959 3 Sheets-Sheet 1

INVENTOR
LOUIS PAUL CROSET
BY
Irwin S. Thompson
ATTORNEY

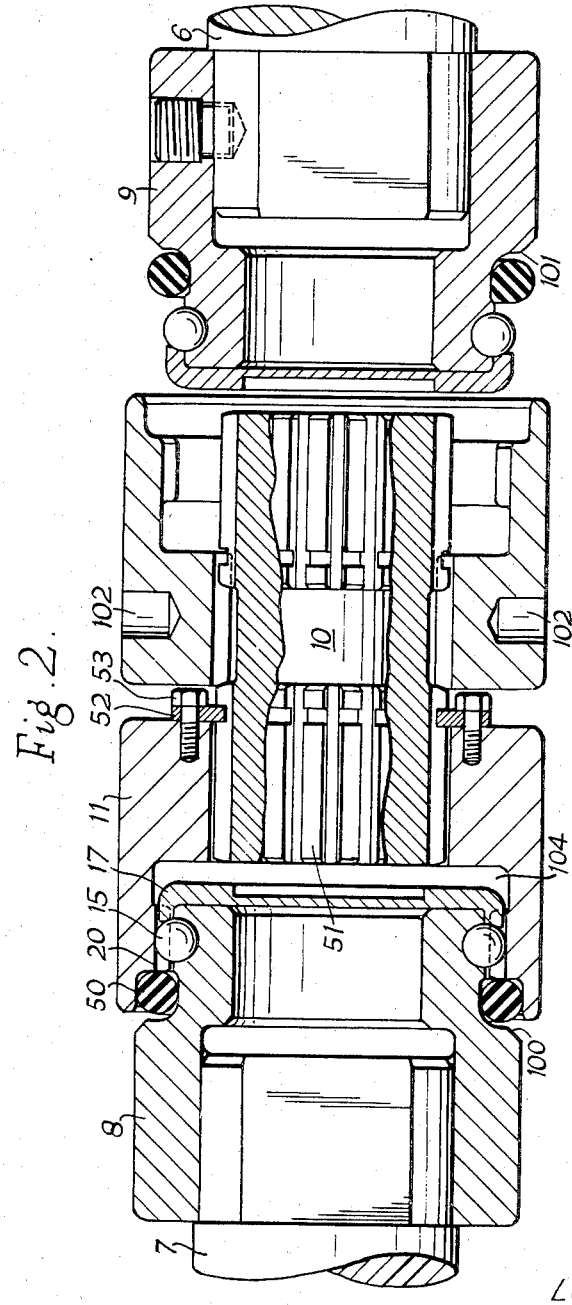

Jan. 24, 1961 L. P. CROSET 2,968,936
SPINDLE COUPLING DEVICES FOR ROTARY MEMBERS
Filed Aug. 20, 1959 3 Sheets-Sheet 3
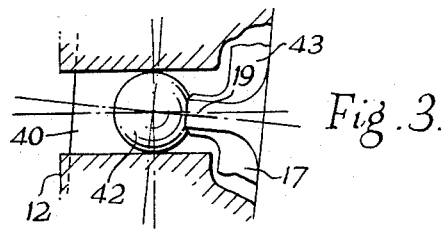
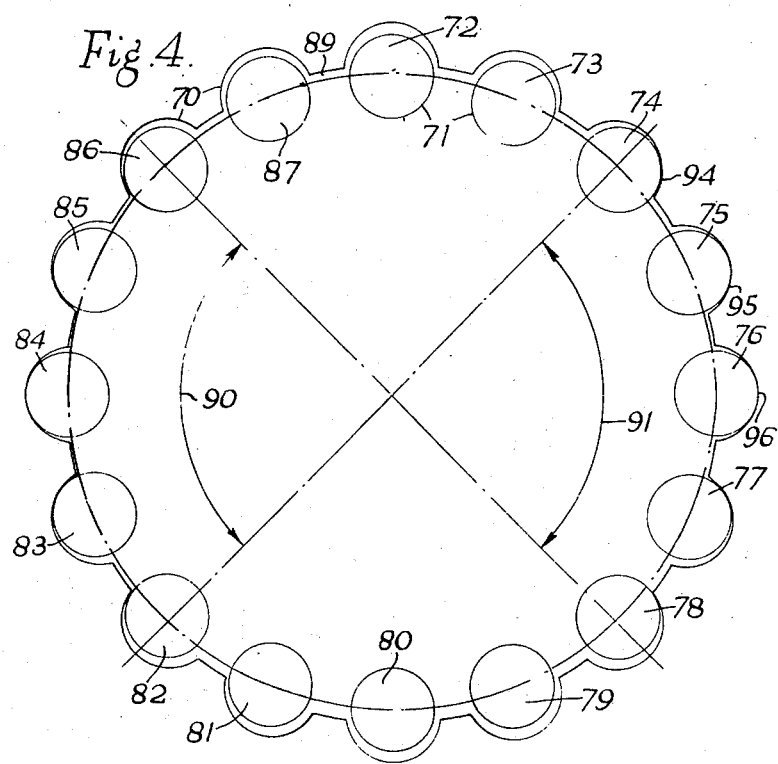
INVENTOR
LOUIS PAUL CROSET
BY
*Irwin S. Thompson*
ATTORNEY

United States Patent Office 2,968,936
Patented Jan. 24, 1961

2,968,936

SPINDLE COUPLING DEVICES FOR ROTARY MEMBERS

Louis Paul Croset, 23 Gernhill Ave., Huddersfield, England

Filed Aug. 20, 1959, Ser. No. 834,976

Claims priority, application Great Britain Aug. 28, 1958

8 Claims. (Cl. 64—7)

This invention relates to spindle coupling devices for transmitting power between two shafts or like members and capable of accommodating axial angular misalignment of at least 2 degrees (mostly at least 3 degrees) e.g. in some cases 0 to 3 degrees and in other cases up to as much as 15 degrees. Particular applications of the invention are for spindles for the drive of work rolls for various kinds of mills such as cold mills, hot mills, rod and merchant mills, tube mills, levellers and related equipment, also ore crushers.

These couplings carry very heavy loads and since stoppage of a mill is very expensive, the couplings must be very reliable for long periods of operation so as to eliminate high maintenance costs.

It has been proposed to provide such couplings in which an annular series of teeth on one coupling member engage in a series of grooves in another coupling member but such teeth are of quite special form to permit misalignment of the shafts and accordingly are somewhat complicated in design and expensive to manufacture. Further in such couplings the flanks of the teeth of the hubs give only line contact in the driving and driven sleeve grooves, thus causing a highly concentrated load and rubbing action with wear involving frequent replacement of parts.

For transmitting heavy loads accompanied by large angular misalignment so-called "slipper type spindles" are commonly used in large rolling mills, such spindles consisting of an inclined shaft having a tongue at each end engaged in slippers which have frusto-cylindrical surfaces engaged in the forked ends of similarly shaped housings or coupling boxes. One tongue is pinned to the coupling box and the slippers for axial location of the spindle and the other is provided with a slot to permit it to slide free on a pin holding the slippers due to the varying angle of tilt of the spindle. Notwithstanding non-uniform velocity inherent with such spindles, they work quite well, and it is difficult to maintain lubricant on the slippers and consequently wear leads to frequent replacement, and excessive strain often causes an opening or actual breaking of the forked ends of the coupling box or spindle, which in many cases means very high maintenance costs. For effecting this replacement the pin must be removed and the slippers are taken off separately.

It has also been proposed to provide a coupling for very small angular misalignment (less than 2 degrees) in which an annular series of balls is located between a hub and a sleeve and seats in grooves in the sleeve but this construction has not been sufficiently practical to become available on the market and in any case was only considered for transmission of low power and very small angular misalignment and was not applied to mill spindles.

According to the present invention the spindle coupling device comprises a shaft having a coupling at each end, each coupling comprising an annular series of balls located between a hub member and a sleeve member that surrounds the hub member, one of said members being connected to the shaft; axially disposed straight semicircular grooves in the sleeve member forming ball tracks, said balls seating with a sliding fit in frusto-spherical recesses in the hub member, said grooves having a radius greater than that of the ball radius to permit driving under the required maximum angular misalignment.

Whilst the size of ball selected for the transmission of any given torque may be influenced by speed, shock loads and application, the radius of the grooves provided in the sleeves bears a direct relation to the pitch circle diameter of the ball track, the angle of tilt and the radius of the ball itself, the size of the required radius being easily calculated from the formula hereinafter appearing. It will also be clear that whatever the specified angle of tilt in actual spindle operation, the designed angle of tilt will be slightly greater for practical reasons and balls having a diameter equal to from 10 to 20 percent of the pitch circle diameter of the ball track have proved satisfactory in practice.

The principle on which the invention is based is a realisation of firstly, the very high load carrying capacity of steel balls e.g. about 30 tons static capacity and about 300 tons crushing load for a steel ball having a diameter of 3″, secondly, the uniformly high quality and dimensional accuracy of steel balls as are commonly available, and, thirdly, that given average machining accuracy and suitable material for the coupling sleeves, having grooves of about the same hardness as the balls and likewise hubs having semi-spherical pockets also suitably hardened, the couplings can operate effectively under heavy loads and large angles up to 15 degrees of misalignment, if the groove radius is larger than the ball radius by a specific value based upon the relative proportions of the pitch circle diameter of the ball track, angle of tilt and ball radius. The reason is that during rotation each ball successively takes up the drive and carries or helps to carry the load over a small part of the complete revolution and during this part the ball rolls on the groove surface to transfer the load evenly along the groove surface. Two or more balls may share the load at each moment. In the semi-spherical sockets the co-efficient of friction is low due to the large engaging surface but in the grooves a high co-efficient of friction exists whereby the balls tend to maintain a non-slipping engagement with the surfaces of the grooves and the balls can slip as required in the sockets. Consequently minimum wear occurs both in the sockets and in the grooves.

The groove radius can be calculated as a function of pitch circle radius P.C.R. (i.e. from the axis of the spindle to the ball centre), maximum required angle A of tilt and radius R of the ball as follows:

$$\text{Groove radius} = \frac{\text{P.C.R.}}{2} - \frac{\cos A \times \text{P.C.R.}}{2} + R$$

For example 5 inch P.C.R. with 1.25 diameter balls, 15 degree maximum tilt:

$$\text{Groove radius} = 2.5 - \frac{.96592 \times 5}{2} + \frac{1.25}{2}$$

$$= 2.5 - 2.4148 + .625$$

$$= .7102 \text{ inch}$$

which is about 14 percent greater than the ball radius (.625).

The balls are made of hard steel e.g. 1 per carbon, 1 per chromium and the sleeve may be of similar quality steel or at any rate the grooves should have the same hardness as the balls and should therefore be surface hardened. The hubs do not need to be so hard and may be 0.5 carbon steel and do not need to be surface hardened.

Further, according to the invention, axial location of the shaft may be achieved by providing the hubs with frusto-spherical surfaces engaging similar surfaces in the coupling boxes or sleeves, said spherical abutments being adapted to permit angular displacement of the spindle and also to prevent escape of lubricant.

The invention will now be described by way of example with reference to the accompanying diagrammatic drawings wherein:

Figure 2 is a view similar to part of Figure 1 but showing a modification;

Figure 3 shows a detail to be described; and

Figure 4 is a geometrical view illustrating the principle of the invention.

Figure 1:
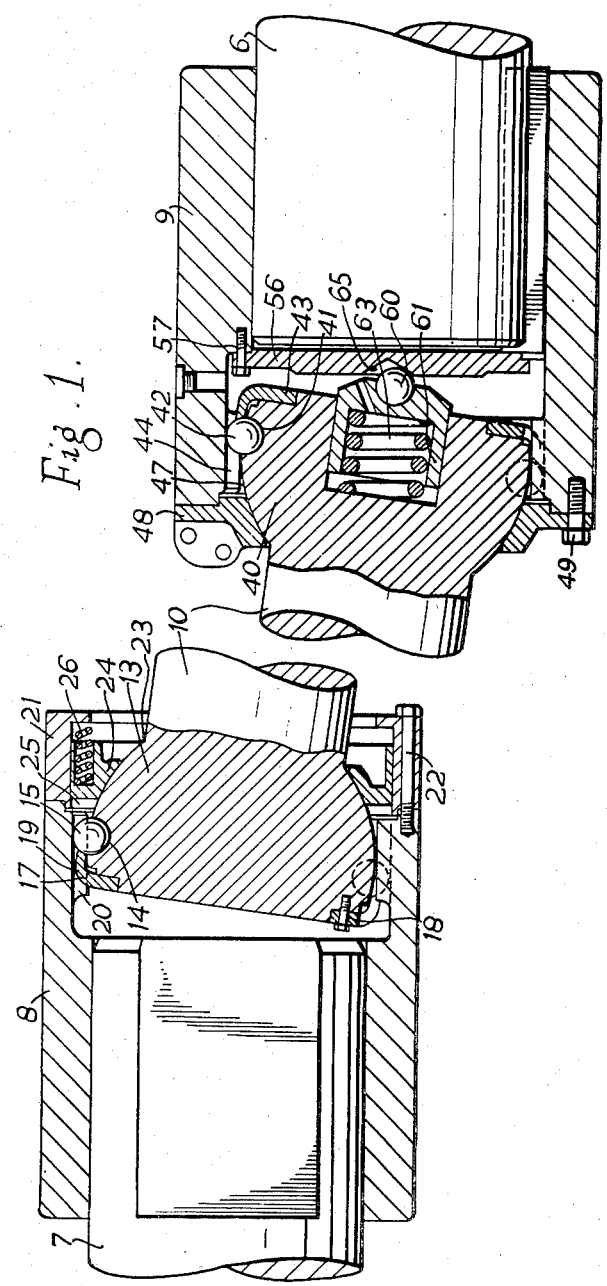
Figure 1 is a view partly in elevation and partly in section showing a shaft drive with couplings adapted for driving a rolling mill and made in accordance with the invention.

In Figure 1 an inclined shaft 10 is required to transmit drive from a shaft coupling box 11 to another shaft coupling box 12. The coupling box 11 carries a flange 8 for connection to the shaft of a driving motor and the coupling box 12 carries a flange 9 for connection to the shaft of the rolling mill, crusher or the like. The flanges 8, 9 are to be regarded as parts of the boxes 11, 12. The upper end of the shaft 10 carries a hub 13 formed in its outer peripheral surface with an annular set of frusto-spherical depressions or sockets 14 in which hardened steel balls 15 are seated. These depressions have only a slight clearance of the order of one thousandth of an inch (e.g., .0007 to .0014) per inch of the ball diameter so that the ball is closely located with a sliding fit. A retaining ring 17 is detachably secured to the hub by bolts 18 and the outer periphery of the retaining ring has fingers 19 (Figure 3) located in close proximity to the balls so as to hold the balls firmly in the depressions not only during operation under angular misalignment but also during assembly or withdrawal of the coupling box.

The balls engage in grooves in an internal flange 20 on the sleeve 11, these grooves extending parallel to the axis of the sleeve. The hub 13 has a frusto-spherical surface 23 engaged by a hub retaining ring 24 which has a correspondingly shaped surface and is urged towards the surface 23 by springs 26 contained by a cover 21 bolted by bolts 22 to the sleeve 11 so as to hold lubricant within the sleeve (in the space 25) while allowing for angular misalignment.

Thus the whole assembly of the hub balls, retaining rings and associated parts can be assembled on the shaft 10 and removed as one piece at any time required for inspection, after prior removal of the retaining cover 21.

The other end of the shaft 10 carries a hub 40 which has similar frusto-spherical depressions or sockets 41 holding balls 42 which are retained by a ring 43 and engage grooves in an internal flange 44 of the sleeve 12. The hub 40 has a frusto-spherical surface 47 engaged by a correspondingly shaped surface on a cover ring 48 which is bolted to the hub by bolts 49 said cover making a lubricant tight joint on the spherical surface 47 of the hub. The spindle 10 with the hubs thus has some axial movement against the action of the springs 24 whilst lubricant is retained at both sets of balls by the frusto-spherical surfaces 23, 47 which face in opposite directions.

A bearing plate 56 secured by screws 57 across the flange and having a central conical bearing recess engaged by a steel ball 60 carried by a plunger 61 slidably located in a bore in the spindle and urged towards the recess by a strong spring 63. This holds the flange 8 in axial alignment with the spindle when changing a roll.

The spindle is located at one end by the retaining ring and spring and the action of the springs at both ends permit axial float involved to enable the required angular movements to occur.

In the modification shown in Figure 2 the ring 17 is on the spindle side of the balls 15 and on the other side is a packing ring 50 held compressed between the coupling box 11 and the flange 8. The box 11 engages the spindle by means of splines 51 and a toothed ring 52 is bolted by bolts 53 to the box 11 and contains the lubricant on one side of the balls; the lubricant being retained on the other side by the packing ring 50. The balls 15 are carried by the flange 8 and the coupling box carries the grooves 20.

This spindle is particularly adaptable for the drive of work rolls between the stands of multi-stand mills operating at a relatively small angle of tilt e.g. 4 degrees. In this spindle, the normal arrangement shown in Figure 1 is reversed inasmuch as the hubs are fitted (preferably permanently) upon an extension of the work roll 94 and the coupling boxes or sleeves are slidably mounted on the spindle shaft by means of splines.

During operation the axial location of the coupling boxes is effected through a split ring engaged in a circular groove on the inner side of said splines, each ring half being secured by two or more set screws and lock washers. Two rings of resilient material serve the dual purpose of effecting a seal for the lubricant and for the axial location while leaving the shaft and sleeve assembly free to float between the abutments on the spindle hubs.

When a change of either of the connected work rolls is necessary the rings are removed and the sleeve can then be drawn out axially with the help of tommy bars inserted in the hole shown, until a clearance space occurs between the sleeve and the ball retaining ring, whereupon the roll is removed complete with the hub and is replaced by another roll complete with hub and associated parts, the hub being a good fit on the roll extension which is provided either with flats or with clover leaf grooves in end view.

Figure 4 shows the grooves 70, sockets 71 and sixteen balls, 72, 73, 74, 75, 76, 77, 78, 79, 80, 81, 82, 83, 84, 85, 86, and 87. The balls at any angle of tilt move in an elliptical path 89 when viewed axially. All the balls retain full engagement with the sockets 71. The balls 72, 73 are out of contact with the grooves and carry no driving load in these positions. The ball 74 has just taken up driving engagement at 94 with the groove and as the ball moves from 74 to 75 the ball rolls from 94 to 95, the ball sliding in the sockets to permit rolling engagement of ball and groove to be maintained. Ball 76 has contact with the groove 70 at 96 where it ceases to carry load. Balls 77, 78, 79, 80, 81 carry no load but again at 82, 83 take up driving load and again maintains rolling engagement with the groove. Balls 84, 85, 86, 87 again carry no load. The zones of contact of balls and grooves are shown at 90 and 91.

Although the size of balls used may vary considerably for different applications, it has been found desirable in the case of spindles for rolling mills and like applications to use balls having a diameter about 12 percent of the pitch circle diameter of the balls in the hub and for such ball size it has further been found that a groove radius about 115 percent that of the ball radius will permit a maximum angle of tilt up to about 15 degrees. Determination of the size of the groove radius required can be made either graphically or mathematically for any given set of conditions, i.e. for varying degrees of misalignment capacity.

Drive will occur only through about two, four, six or more diametrically opposed balls at any instant, depending upon the number of balls and the angle of tilt, which in some applications varies with each pass of the material between the rolls with the remaining balls out of contact with the grooves.

The invention is therefore based on the unexpected possibility that a ball type coupling can be used for large angles of misalignment if one selects the type of ball coupling that has frusto-spherical recesses in the hub and grooves in the sleeve, uses the required groove radius, provides means for holding the balls in the recesses and uses suitable materials of adequate hardness in the grooves and recesses, so as to prevent indentation by the balls.

When the hubs and sleeves are in alignment the balls engage all the grooves with a small working clearance not exceeding say about one to two thousandths of an inch per diameter of the balls.

I claim:

1. A spindle coupling device for transmitting power between two shafts or like members and capable of accommodating axial angular misalignment of at least 2 degrees comprising a coupling comprising an annular series of balls located between a hub member and a sleeve member that surrounds the hub member, one of said members being connected to the shaft; axially disposed semi-circular grooves in the sleeve member forming ball tracks, said balls seating with a sliding fit in frusto-spherical recesses in the hub member, each groove having a surface formed integrally in said sleeve member parallel to the axis of the sleeve member and having a single radius of curvature said radius being greater than that of the ball radius to permit driving under the required maximum angular misalignment, said groove radius is equal to approximately $$\frac{P.C.R.}{2} - \frac{\cos.A \times P.C.R.}{2} + R$$

wherein P.C.R. is the pitch radius, A is the maximum angle of tilt and R is the ball radius.

2. A device as claimed in claim 1 wherein the hub member has a frusto-spherical surface engaged by a similar surface on a member attached to the sleeve member for axial location and retention of lubricant.

3. A device as claimed in claim 2 wherein the frusto-spherical member is urged towards the hub member by springs retained by a cap bolted to the sleeve member.

4. A device as claimed in claim 1 having such a coupling at each end of a shaft and wherein the sleeve member on the output side is held in axial alignment during replacements by resilient engagement of a central ball on one member engaging a conical recess in the other member.

5. A device as claimed in claim 1 wherein a resilient packing ring is provided between the members to provide for movement whilst retaining lubricant on the balls.

6. A device as claimed in claim 1 wherein the sleeve member is splined on the shaft, the sleeve member being located axially by a retaining ring in two halves entering a groove having a diameter slightly less than that of the root of the splines so as to also serve the purpose of retaining the lubricant.

7. A device as claimed in claim 1 wherein the balls are held in the sockets against centrifugal force during operation and also when dismantling by rings having teeth engaged in the grooves.

8. A device as claimed in claim 1 having such a coupling at each end of a shaft and wherein the hub members have frusto-spherical surfaces facing towards each other and engaged by similar surfaces carried by the sleeve members, and comprising spring means urging the surfaces into engagement to permit some axial movement of the spindle whilst retaining lubricant on the balls.

References Cited in the file of this patent
UNITED STATES PATENTS

| | | |
|---|---|---|
| 1,103,716 | Wallbillich | July 14, 1914 |
| 2,441,052 | Wilmer | May 4, 1948 |
| 2,809,504 | Erish | Oct. 15, 1957 |

FOREIGN PATENTS

| | | |
|---|---|---|
| 8,775 | Great Britain | Sept. 7, 1911 |